United States Patent
Zhang et al.

(10) Patent No.: US 10,306,532 B2
(45) Date of Patent: May 28, 2019

(54) PRK-BASED SCHEDULING FOR PREDICTABLE LINK RELIABILITY

(71) Applicant: WAYNE STATE UNIVERSITY, Detroit, MI (US)

(72) Inventors: Hongwei Zhang, Troy, MI (US); Xiaohui Liu, Menlo Park, CA (US); Chuan Li, Detroit, MI (US)

(73) Assignee: Wayne State University, Detroit, MI (US)

( * ) Notice: Subject to any disclaimer, the term of this patent is extended or adjusted under 35 U.S.C. 154(b) by 754 days.

(21) Appl. No.: 14/776,806

(22) PCT Filed: Mar. 14, 2014

(86) PCT No.: PCT/US2014/027055
§ 371 (c)(1),
(2) Date: Sep. 15, 2015

(87) PCT Pub. No.: WO2014/152192
PCT Pub. Date: Sep. 25, 2014

(65) Prior Publication Data
US 2016/0050613 A1    Feb. 18, 2016

Related U.S. Application Data

(60) Provisional application No. 61/788,445, filed on Mar. 15, 2013.

(51) Int. Cl.
*H04W 40/16*  (2009.01)
*H04W 40/20*  (2009.01)
*H04W 72/12*  (2009.01)
*H04L 12/863* (2013.01)

(52) U.S. Cl.
CPC ........... *H04W 40/16* (2013.01); *H04L 47/626* (2013.01); *H04W 40/20* (2013.01);
(Continued)

(58) Field of Classification Search
CPC . H04W 40/16; H04W 40/20; H04W 72/1231; H04W 72/1242; H04W 24/10;
(Continued)

(56) References Cited

U.S. PATENT DOCUMENTS 7,941,178 B2    5/2011  Guo et al.
8,493,955 B2 *  7/2013  Nandagopalan ....... H04B 1/719
                                                    370/230
(Continued)

FOREIGN PATENT DOCUMENTS

EP    1039689      9/2000
WO    2009109257   9/2009

OTHER PUBLICATIONS

International Preliminary Report on Patentability for PCT Application No. PCT/US2014/027055, dated Sep. 24, 2015.
(Continued)

*Primary Examiner* — Kibrom T Hailu
(74) *Attorney, Agent, or Firm* — Carlson, Gaskey & Olds, P.C.

(57) ABSTRACT

A Distributed sensing and control network includes multiple sensing/control nodes, each of which includes a controller. Each sensing/control node determines signal transmission/receipt scheduling based on a physical-ratio-k-scheduling (PRKS) protocol stored within the controller.

30 Claims, 5 Drawing Sheets

(52) U.S. Cl.
CPC ... *H04W 72/1231* (2013.01); *H04W 72/1242* (2013.01); *Y02D 70/144* (2018.01); *Y02D 70/22* (2018.01); *Y02D 70/34* (2018.01); *Y02D 70/38* (2018.01)

(58) Field of Classification Search
CPC . H04W 40/12; H04W 48/04; H04W 72/1226; H04W 84/18; H04L 47/626; H02D 70/38; H02D 70/00; H02D 70/144; H02D 70/34
See application file for complete search history.

(56) References Cited

U.S. PATENT DOCUMENTS

| | | |
|---|---|---|
| 2008/0101331 A1 | 5/2008 | Lee et al. |
| 2009/0147790 A1 | 6/2009 | Kang et al. |
| 2012/0149414 A1 | 6/2012 | Krishnaswamy et al. |

OTHER PUBLICATIONS

Xin Che et al: "Adaptive Instantiation of the Protocol Interference Model in Mission-Critical Wireless Networks", Sensor Mesh and AD HOC Communications and Networks (SECON), 2010 7th Annual IEEE Communications Society Conference on, IEEE, Piscataway, NJ, USA, Jun. 21, 2010 (Jun. 21, 2010), pp. 1-9, XP031707841, ISBN: 978-1-4244-7150-8.

Zhang Hongwei et al: "Poster abstract: PRK-based scheduling for predictable link reliability in wireless networked sensing and control", 2013 ACM/IEEE International Conference on Cyber-Physical Systems (ICCPS), IEEE, Apr. 8, 2013 (Apr. 8, 2013), p. 255, XP032483606, DOI: 10.1109/ICCPS.2013.6604033 [retrieved on Sep. 18, 2013].

Hongwei Zhang et al: 11 Adaptive instantiation of the protocol interference model in wireless networked sensing and control, ACM Transactions on Sensor Networks, ACM, 2 Penn Plaza, Suite 701 New York NY 10121-0701 USA, vol. 10, No. 2, Jan. 31, 2014 (Jan. 31, 2014), pp. 1-48, XP058035241, ISSN: 1550-4859, DOI: 10.1145/2530286.

Supplementary European Search Report for Application No. 14768253.8 dated Jun. 23, 2016.

International Search Report and Written Opinion for PCT Application No. PCT/US2014/027055, dated Jun. 25, 2014.

*Intellectual Ventures I LLC v. T Mobile Inc., et al*, Order Carrying In-Part and Denying In-Part Defendant's Motion to Dismiss (Dkt. No. 23), Civil Action No. 2:17-CV-00577-JRG.

\* cited by examiner

PRK-BASED SCHEDULING FOR PREDICTABLE LINK RELIABILITY

CROSS-REFERENCE TO RELATED APPLICATIONS

This disclosure claims priority to U.S. Provisional Application No. 61/788,445, which was filed on Mar. 15, 2013 and is incorporated herein by reference.

STATEMENT REGARDING GOVERNMENT SUPPORT

This invention was made with Government support under grant number 1054634 awarded by the National Science Foundation. The Government has certain rights in the invention.

TECHNICAL FIELD

The present disclosure relates generally toward wireless communication scheduling, and more particularly to a sensing and control network including a physical-ratio-K scheduling protocol (PRKS).

BACKGROUND OF THE INVENTION

Wireless networks are utilized for real-time, closed-loop sensing and control in networked cyber-physical systems. For instance, wireless networking standards have been defined for industrial monitoring and control, wireless networks have been deployed for industrial automation, and the automotive industry has also been exploring the application of wireless networks to inter-vehicle as well as intra-vehicle sensing and control.

In wireless networked sensing and control (WSC) systems, message passing across wireless networks (or wireless messaging for short) allows for coordination among distributed sensors, controllers, and actuators. When supporting mission-critical tasks such as industrial process controls, wireless messaging is required to be reliable (i.e., having high delivery ratio) and to be in real-time. Current wireless messaging systems are subject to inherent dynamics and uncertainties. Co-channel interference is a major source of uncertainty due to collisions of concurrent transmissions. Thus, scheduling transmissions to prevent co-channel interference is a basic element of wireless messaging in WSC systems.

In WSC systems, not only do wireless link dynamics introduce uncertainty as in traditional wireless sensing/control networks, dynamic control strategies also introduce dynamic network traffic patterns and pose different requirements on messaging reliability and timeliness. For agile adaptation to uncertainties and for avoiding information inconsistency in centralized scheduling, distributed scheduling becomes desirable for interference control in WSC networks. Most existing systems are either based on a physical interference model or a protocol interference model.

In the physical model, a set of concurrent transmissions $(S_i, R_i)$, $i=1 \ldots N$, are regarded as not interfering with one another if the following conditions hold true: $((P_{S_i,R_i})/(N_i + \Sigma_{j=1 \ldots N, j \neq i} P_{S_j,R_i})) \geq \gamma$, $i=1 \ldots N$, where $P_{S_i,R_i}$ and $P_{S_j,R_i}$ is the strength of signals reaching the receiver $R_i$ from the transmitter $S_i$ and $S_j$ respectively, $N_i$ is the background noise power at receiver $R_i$, and $\gamma$ is the signal-to-interference-plus-noise-ratio (SINR) threshold required to ensure a certain link reliability. In the protocol model, a transmission from a sending node S to a corresponding receiver node R is regarded as not being interfered by a concurrent transmitter C if $D_{C,R} \geq K \times D_{S,R}$, where $D_{C,R}$ is the geographic distance between C and R, $D_{S,R}$ is the geographic distance between S and R, and K is a constant number.

The physical model is a high-fidelity interference model in general, but interference relations defined by the physical model are non-local and are combinatorial because whether one transmission interferes with another depends on the other transmissions in the network. Even though many centralized TDMA scheduling algorithms have been proposed based on the physical model, distributed physical-model-based scheduling still has drawbacks. It converges slowly due to explicit network-wide coordination, it has to employ strong assumptions such as the knowledge of node locations, it ignores cumulative interference which introduces uncertainties in communication, and it is not suitable for dynamic network settings due to a need for centrally computing an interference set of each link (i.e., the set of links interfering with the link) or the interference neighborhood of each link (i.e., the set of links causing non-negligible interference to the link). The challenge of designing scheduling protocols when interfering links are beyond the communication range of one another is similarly not addressed in existing physical-model-based scheduling algorithms.

Unlike the physical model, the protocol model defines local, pairwise interference relations. The locality of the protocol model enables agile protocol adaptation in the presence of uncertainties. However, the protocol model is usually inaccurate, thus scheduling based on the protocol model or variants of the protocol model does not ensure link reliability and also tends to reduce network throughput.

Besides scheduling based on the physical and protocol interference models, distributed scheduling algorithms using general pairwise interference models have also been proposed. The distributed scheduling algorithms do not address how to identify the interference set of each link, and their implementations assume a model similar to the protocol model. These algorithms do not address important systems issues such as how to design scheduling protocols when interfering links are beyond the communication range of one another.

To bridge the gap between the existing interference models and the design of distributed, field-deployable scheduling protocols with predictable data delivery reliability and timeliness, a major challenge is to develop an interference model that is both local and of high-fidelity.

SUMMARY OF THE INVENTION

Disclosed is a distributed sensing and control network including a plurality of sensing/control nodes, each of the sensing/control nodes including a sensor/actuator/controller, a local memory and a wireless transmitter/receiver, wherein the local memory stores instructions for implementing a physical-ratio-K-scheduling protocol (PRKS) for wireless transmissions, and each of the sensing/control nodes includes a local signal map stored in the local memory. The local signal map, together with the instantiated physical-ratio-K (PRK) interference models, defines an interference relationship between a sensing/control node storing the local signal map and each other sensing/control node of the plurality of sensing/control nodes within an exclusion region of the sensing/control node storing the local signal map.

Also disclosed is a method for scheduling wireless transmissions in a distributed sensing and control network, including the steps of determining a physical-ratio-K (PRK) parameter for each link between a receiving sensing/control node and each other sensing/control node in the distributed sensing and control network, determining an interference relationship between the receiving sensing/control node and each other sensing/control node in the distributed sensing and control network using a physical-ratio-K-scheduling protocol (PRKS) based on the determined physical-ratio-K parameters, and scheduling transmissions in the distributed sensing and control network based on said interference relationships such that no concurrent transmissions interfere with transmissions received at a receiving sensing/control node.

These and other features of the present invention can be best understood from the following specification and drawings, the following of which is a brief description.

DETAILED DESCRIPTION OF AN EMBODIMENT

Figure 1:
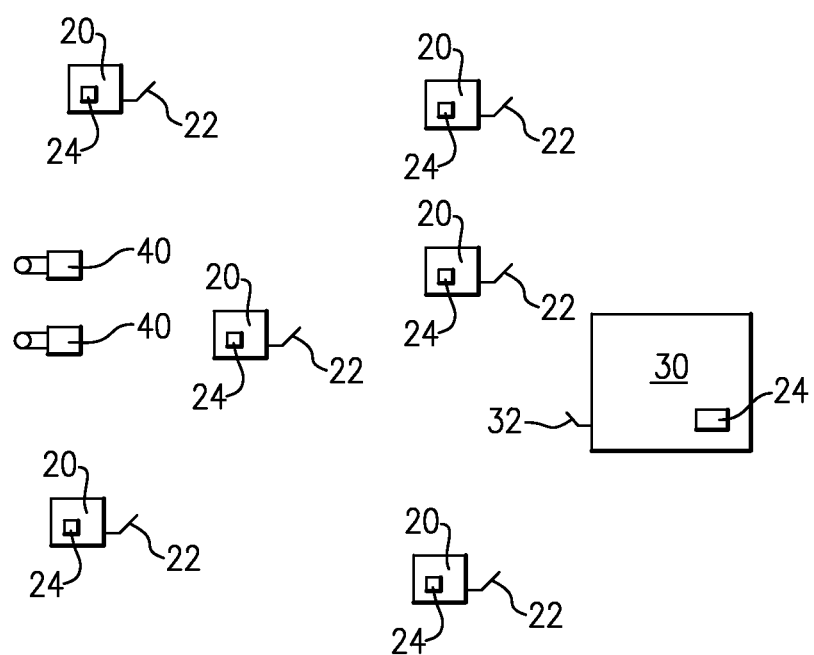
FIG. 1 illustrates a distributed sensing and control network utilizing a PRKS scheduling protocol.

FIG. 1 illustrates an example distributed sensing and control network 10 including multiple distributed sensors 20 and a central controller 30. Each of the distributed sensors 20 includes a wireless transmitter/receiver 22, and the central application controller 30 includes a wireless transmitter/receiver 32. Each of the sensors 20 and the central application controller 30 also includes a local controller 24 having a memory. The memory on the local controller 24 stores instructions for operating the corresponding remote sensor 20 or central application controller 30. Included among these instructions is a physical-ratio-K scheduling (PRKS) protocol instruction that controls the message scheduling from each of the sensors 20 in the manner described below. The illustrated example sensing and control network 10 can be any sensing and control network having multiple sensors 20 in close physical proximity to each other including, but not limited to, a distributed sensing and control network in an automobile, an industrial automation system, or a fleet of vehicles.

During operation of the distributed sensing and control network 10, each of the sensors 20 transmits information related to the sensed component or process to the controller 30 or to other sensors 20 in the distributed sensing and control network 10. The controller 30 utilizes a combination of data from the sensors 20 to determine appropriate responses and transmits the responses to actuators 40 within the system. In alternate distributed sensing and control networks 10, some or all of the sensors 20 can include actuators or other responsive components and receive instructions from the central controller 30. In a practical implementation, some, or all, of the sensors 20 communicate directly with at least one other sensor 20 without transmitting through the controller 30. Each of the sensors 20 and the controller 30 are alternately referred to below as a "node".

Due to the proximity of the sensors 20 with each other, transmission from a sensor 20 can interfere with transmissions received by other sensors 20, should the transmissions temporally overlap. In order to prevent this overlap and interference, a robust message scheduling protocol based on a physical-ratio-K (PRK) model is implemented in each of the sensors 20. The PRK-based scheduling protocol is referred to as a PRKS protocol.

A physical-ratio-K (PRK) interference model that integrates the protocol model's locality with the physical model's high-fidelity has been proposed to model expected interference. Given a transmission from a sending node S to a receiving node R, a concurrent transmitter C is regarded as not interfering with the reception at R in the PRK model if, and only if, the following holds true: $P(C, R) < (P(S, R))/(K_{S,R,T_{S,R}})$ where $P(C, R)$ and $P(S, R)$ is the strength of signals reaching R from C and S respectively. $K_{S,R,T_{S,R}}$ is the minimum real number (i.e., can be non-integer) chosen such that, in the presence of interference from all concurrent transmitters, the probability for node R to successfully receive packets from node S is at least $T_{S,R}$. $T_{S,R}$ is the minimum link reliability required by applications (e.g., control algorithms).

Unlike the physical model, the PRK model is based on locally measurable and locally controllable metrics and only pairwise interference relations between close-by nodes need to be defined in the model. Unlike the protocol model, the PRK model is of high-fidelity because the PRK model captures the properties and constraints of wireless communication (including cumulative interference, anisotropy, and asymmetry) by ensuring the required link reliability in scheduling and by using signal strength instead of geographic distance in model formulation. PRK-based scheduling also helps reduce data delivery delay by minimizing the need for packet retransmissions. Furthermore. PRK-based scheduling can enable a throughput very close to (e.g., >95%) what is feasible in physical-model-based scheduling while ensuring application-required reliability. Therefore, the PRK model bridges the gap between the suitability for distributed implementation and the enabled scheduling performance in existing interference models.

Existing forays into the PRK model have ignored the practical problem of PRK-based scheduling for real-world applications.

To realize distributed PRKS scheduling in a practical application, such as the distributed sensing and control network 10 of FIG. 1, the following points are addressed:

First, the parameter $K_{S,R,T_{S,R}}$ of the PRK model depends on the specific link (sending node S, receiving node R), the application requirement on the link reliability (i.e., the targeted link reliability $T_{S,R}$), as well as the network and environmental conditions such as traffic pattern and wireless path loss, which can be dynamic and unpredictable. Thus, the practical PRKS system instantiates the PRK model parameter $K_{S,R,T_{S,R}}$ on the fly in each node based on in-situ application requirements as well as network and environmental conditions.

Second, given a link (S, R) between a sending node S and a receiving node R and a specific instantiation of the PRK model, the parameter $K_{S,R,T_{S,R}}$ defines an exclusion region $E_{S,R,T_{S,R}}$ around the receiving node R (the wireless transmitter/receiver 22 of the receiving sensor 20) such that a concurrent node C is within $E_{S,R,T_{S,R}}$ if and only if $P(C, R) \geq (P(S,R)/K_{S,R,T_{S,R}})$ where P(C, R) is the strength of data signals reaching the receiving node R from the concurrent node C. Every node C within the exclusion region is prevented from transmitting concurrently with the reception at node R. It is difficult to ensure this property due to large interference range, anisotropy and asymmetry in wireless communication, as well as the delay in protocol signaling.

In PRKS, the problem of identifying the PRK model parameter $K_{S,R,T_{S,R}}$ is designed as a minimum-variance regulation control problem. Distributed controllers 24 within the sensors 20 and the central application controller 30 allow each sensor 20 and the central application controller 30 to adapt a stored PRK model parameter for ensuring the desired link reliability through purely local coordination. To ensure that sensors 20 and the central application controller 30 interfering with one another (as defined by the PRK model) do not transmit concurrently, each sensor 20 and the central application controller 30 includes a local signal map stored in local memory of the sensor/application-controller, the local signal map allows sensors 20 and the central application controller 30 close-by to maintain the wireless path loss among themselves. Together with the PRK model and transmission power control in protocol signaling, local signal maps enable the sensors 20 and the central application controller 30 to precisely identify the interference relations among themselves despite the anisotropic, asymmetric wireless communication and large interference range of the distributed sensor system 10. To address any inherent delay in protocol signaling and to avoid interference between protocol signaling and data transmissions, the PRKS protocol decouples protocol signaling from data transmissions and schedules data transmissions in a TDMA fashion.

The local controllers 24 in the sensors 20 and the central application controller 30 enable network-wide convergence to a state where desired link reliabilities are ensured. Unlike existing scheduling protocols where link reliability can be as low as 2.49%, the PRKS protocol enables predictably high link reliability (in one example the high link reliability is at least 95%) in different network and environmental conditions without a priori knowledge of the network and environmental conditions.

In this disclosure, we consider mostly-static wireless sensing and control (WSC) networks such as those in industrial monitoring and control. For explanatory purposes, we assume that background noise power and wireless path loss are mostly static and do not change within very short timescales (e.g., within a few milliseconds duration of a few packet transmissions), that the links are chosen such that their packet delivery reliabilities are above the required packet delivery reliability in the absence of interference, and that data packets are transmitted using a fixed power. In what follows, we first describe a control-theoretic approach to instantiating the PRK model, then we present local signal maps, such as would be stored in the sensors 20 in the distributed sensing and control network 10 as the basis for protocol signaling. Next, we present the protocol PRKS for distributed PRK-based scheduling. Finally, we present methods for extending PRKS for broadcast transmissions and scheduling in mobile networks. As described above, each of the sensors 20 in the distributed sensing and control network 10 includes a controller having a memory storing the PRKS protocol. Table 1 defines some major notations used in this disclosure.

TABLE 1

| | |
|---|---|
| $Y_{S,R}(t)$ | Measured packet delivery rate for link (S, R) at time t. |
| P(S,R,t) | Expected power in units of mW, of data packet signals reaching R from S at time t; assumed to be mostly static at short timescales. |
| $P_{S,R}(t)$ | Expected power, in units of dBm, of data packet signals reaching R from S at time t; |
| $I_R(t)$ | Sum of background noise power and interference power at receiver R at time t. |
| f( ) | The function modeling the relation between packet delivery rate and SINR. |
| a(t) | $f'(P_{S,R}(t) - I_R(t))$. |
| b(t) | $f(P_{S,R}(t) - I_R(t)) - (P_{S,R}(t) - I_R(t))f'(P_{S,R}(t) - I_R(t))$. |
| y(t) | Smoothed link reliability measurement, i.e., $y(t) = cy(t-1) + (1-c)Y_{S,R}(t)$. |
| c | Parameter of the EWMA filter in feedback loop. |
| $\Delta I_R(t)$ | Computed control input at time instant t. |
| $\Delta I_U(t)$ | Change of interference from outside the exclusion region of R from time t to t + 1. |
| $\mu_U(t)$ | Mean of $\Delta I_U(t)$. |
| $\sigma_U^2(t)$ | Variance of $\Delta I_U(t)$. |
| $K_{S,R,T_{S,R}}(t)$ | PRK model parameter for link (S, R) at time t. |
| $E_{S,R,T_{S,R}}(t)$ | Exclusion region around receiver R at time t; a node $C \in E_{S,R,T_{S,R}}(t)$ iff. $P_{C,R}(t) \geq \dfrac{P_{S,R}(t)}{K_{S,R,T_{S,R}}(t)}$. |
| $P'_{C,R}$ | Average signal power attenuation from a node C to another node R; maintained in nodes' local signal maps. |
| $d_{R,S}$ | Delay in the receiver R sharing the latest PRK model parameter of link (S, R) with the transmitter S. |
| $d'_{S,R,C,D}$ | Delay in a node S sharing its knowledge of the latest PRK model parameter of link (C, D) with another node R. |

Given a link (S, R), the task of instantiating the PRK model in the receiving node R is to determine the parameter $K_{S,R,T_{S,R}}$ such that the resulting scheduling ensures the required minimum link reliability $T_{S,R}$. In a practical implementation, the PRK model instantiation problem is formatted as a classical regulation control problem, where the "reference input" is the required link reliability $T_{S,R}$, the "output" is the actual link reliability $Y_{S,R}$ from the sending node S to the receiving node R, and the "control input" is the parameter $K_{S,R,T_{S,R}}$.

To solve this control design problem, one challenge is the difficulty in characterizing the "plant model" on the relation between control input $K_{S,R,T_{S,R}}$ and control output $Y_{S,R}$. This difficulty arises because the relation is complex and depends on network and environmental conditions which are unpredictable in the practical distributed sensing and control network 10. It is noted that the outcome of changing the control input $K_{S,R,T_{S,R}}$ is the change in the interference power at receiver R. The change in interference power, denoted by $\Delta I_R$, is the actual control input in control algorithm design. Thus, existing communication theory is leveraged to derive the plant model on the relation between $Y_{S,R}$ and $\Delta I_R$ as follows.

$I_R(t)$ denotes, in units of dBm, the sum of the background noise power and the power of all interfering signals at the receiver R at time instant t. $P_{S,R}(t)$ denotes the received data signal power P(S, R) in units of dBm at time instant t. Given a modulation and coding scheme, communication theory determines the following relationship, referred to as the "theoretical model": $Y_{S,R}(t) = f(P_{S,R}(t) - I_R(t))$, where f is a non-decreasing function, and $P_{S,R}(t)-I_R(t)$ represents the SINR in dB at time instant t. For IEEE 802.15.4-compatible radios such as Chipcon CC2420, for instance.

$$Y_{S,R}(t) = \left(1 - \frac{8}{15} \times \frac{1}{16} \times \sum_{k=2}^{16} (-1)^k \binom{16}{k} e^{(20\times(P_{SR}(t)-I_R(t))\times(\frac{1}{k}-1))}\right)^{8l},$$

where l is the packet length in units of bytes. Given that the function f is usually non-linear, and to address this challenge of non-linear control, the PRKS protocol approximates function f using multiple linear functions, and depending on the current operating point of the system, uses self-tuning regulators to adapt controller behavior. Given the SINR $P_{S,R}(t)-I_R(t)$ at time instant t (t=1, 2, . . . ), more specifically, we approximate function f with the following linear function, referred to as "the linear model":

$$Y_{S,R}(t)=a(t)(P_{S,R}(t)-I_R(t))+b(t)$$

where a(t) is the derivative of function f when the SINR is $P_{S,R}(t)-I_R(t)$, i.e., $a(t)=f'(P_{S,R}(t)-I_R(t))$, and $b(t)=f(P_{S,R}(t)-I_R(t))-(P_{S,R}(t)-I_R(t))f'(P_{S,R}(t)-I_R(t))$. Assuming that the background noise power is the same from time t to t+1, $I_R(t+1)$ may differ from $I_R(t)$ for two possible reasons:

First, from time t to t+1, the PRK model parameter may change from $K_{S,R,T_{S,R}}(t)$ to $K_{S,R,T_{S,R}}(t+1)$. Accordingly, the exclusion region around the receiver R changes from $E_{S,R,T_{S,R}}(t)$ to $E_{S,R,T_{S,R}}(t+1)$. If $K_{S,R,T_{S,R}}(t+1)>K_{S,R,T_{S,R}}(t)$, nodes 20, 30 in $E_{S,R,T_{S,R}}(t)$ but not in $E_{S,R,T_{S,R}}(t+1)$ Can introduce interference to the receiving node R at time t but not at time t+1. Similarly, when $K_{S,R,T_{S,R}}(t+1)<K_{S,R,T_{S,R}}(t)$, nodes 20, 30 in $E_{S,R,T_{S,R}}(t+1)$ but not in $E_{S,R,T_{S,R}}(t)$ can introduce interference to the receiving node R at time t+1 but not at time t. $\Delta I_R(t)$ denotes the interference change at the receiving node R due to the change of the PRK model parameter from t to t+1. $\Delta I_R(t)$ can be controlled by the receiver R, thus it is the "control output."

Second, the set of nodes 20, 30 that are not in the exclusion region around the receiver node R but transmit concurrently with the link (S, R) may change from time t to t+1. Accordingly, the interference introduced by the nodes 20, 30 outside the exclusion region around R changes from t to t+1, $\Delta I_U(t)$ denotes this change. $\Delta I_U(t)$ cannot be controlled by the receiving node R, and $\Delta I_U(t)$ is the "disturbance" to the system. The mean and variance of $\Delta I_U(t)$ are denoted as $\mu_U(t)$ and $\sigma^2_U(t)$ respectively.

Considering both of the above possible reasons for $I_R(t)$ and $I_R(t+1)$ being different, we get the equation: $I_R(t+1)=I_R(t)+\Delta I_R(t)+\Delta I_U(t)$, where $\Delta I_R(t)$ and $\Delta I_U(t)$ are in units of dB.

Figure 2:
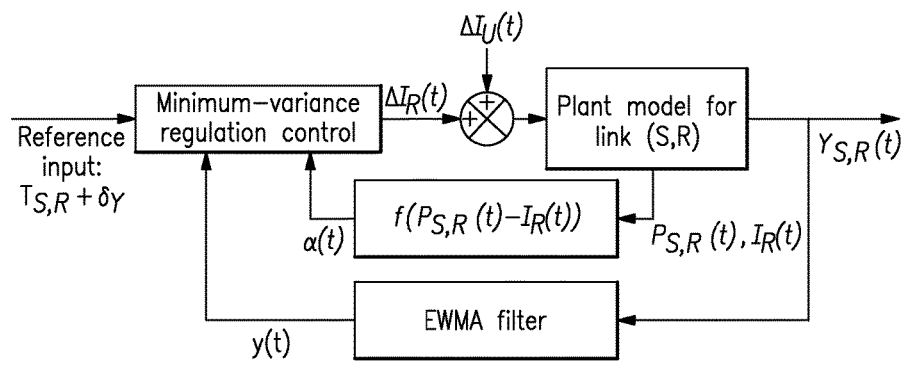
FIG. 2 graphically illustrates a PRKS plant model instantiation.

Using the linear approximation of function f as shown by $Y_{S,R}(t)=a(t)(P_{S,R}(t)-I_R(t))+b(t)$ at time t, the predicted link reliability for time t+1 calculates as follows and is referred to as the "plant" model: $Y_{S,R}(t+1)=a(t)(P_{S,R}(t+1)-I_R(t+1))+b(t)$. Therefore, the "plant model" for link (S, R) at time t is $I_R(t+1)=I_R(t)+\Delta I_R(t)+\Delta I_U(t)$ and $Y_{S,R}(t+1)=a(t)(P_{S,R}(t+1)-I_R(t+1))+b(t)$, where $I_R(.)$ and $Y_{S,R}(.)$ are the "state" and the "output" of the plant respectively. To deal with the noise in measuring $Y_{S,R}(.)$, the PRKS protocol uses an exponentially-weighted-moving-average (EWMA) filter with a weight factor c ($0 \leq c < 1$) in the feedback loop. FIG. 2 graphically illustrates the system model described above, using an exponentially-weighted-moving-average (EWMA) filter of: $y(t)=cy(t-1)+(1-c)Y_{S,R}(t)=cy(t-1)+(1-c)[a(t-1)(P_{S,R}(t)-I_R(t))+b(t-1)]$.

Given the probabilistic nature of wireless communication and the random disturbance $\Delta I_U(.)$ from outside the exclusion region of the receiving node R, the measured link reliability y(t) is expected to be inherently random. Thus the goal is to minimize the variance of y(t) while making sure that the mean value of y(t) is no less than the required link reliability. More formally, the control design at time t chooses a control input $\Delta I_R(t)$ that minimizes the variance of y(t+1) while ensuring that $E[y(t+1)]=T_{S,R}+\delta_Y$ ($\delta_Y>0$), where $T_{S,R}$ is the required link reliability, and $\delta_Y$ controls the probability for $y(t)<T_{S,R}$. For a minimum-variance regulation control problem, the control input that minimizes var[y(t+1)] while ensuring $E[y(t+1)]=T_{S,R}+\delta_Y$ is $$\Delta I_R(t)=(((1+c)y(t)-cy(t-1)-T_{S,R}-\delta_Y)/((1-c)a(t)))-\mu_U(t)$$

And the minimum value of var[y[t+1]] is $$\sigma^2_{y,min}(t+1)=(1-c)^2a(t)^2\sigma^2_u(t)$$

The above relationship is referred to as the minimum variance controller.

Figure 3:
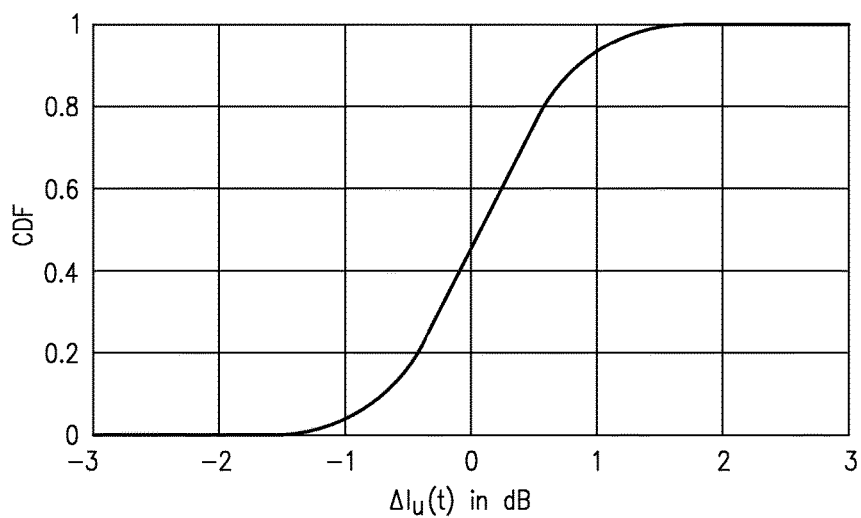
FIG. 3 illustrates a cumulative distribution function of $\Delta I_L(t)$ at a typical sensing/control node.

Given the uniformly random nature of the set of concurrent transmitters outside the exclusion region around the receiving node R, $\mu_U(t)$ tends to be zero in PRKS protocol based systems. In an example sensor 20, for instance, $\mu_U(t)=-0.00005$ dB with a 95% confidence interval of [-0.0453 dB, 0.0452 dB]. Additionally, in a practical implementation of the PRKS protocol $\Delta I_U(t)$ typically centers around 0 dB and lies within [-1 dB, 1 dB]. This relationship is referred to as a cumulative distribution function and is illustrated in FIG. 3. For practical implementations of PRKS scheduling, $\mu_U(t) \approx 0$.

With the minimum variance controller, the expected link reliability for a link (S, R) is guaranteed to be at least the required link reliability $T_{S,R}$. In addition, link reliability undershoot probability is controlled, and defined as:

$$Pr\{y(t+1) \leq T_{S,R}\} \leq \frac{(1-c)^2a(t)^2\sigma^2_u(t)}{\delta^2_Y}.$$

Thus, the undershoot probability is controlled by tuning parameters c and $\delta_Y$. In some examples, the undershoot probability is also tuned by controlling $\sigma^2_U(t)$, which reflects the variability of interference from outside the exclusion region of the receiving node R. In one practical implementation of the presently disclosed PRKS protocol, we let $\delta_Y=0$ and c=15/16 from $\Delta I_R(t)$ to $K_{S,R,T_{S,R}}(t+1)$.

Given that it is convenient for the receiving node R to measure link reliability $Y_{S,R}(t)$, the minimum-variance controller is stored in the memory of each node 20, 30 and executed at the node 20, 30. After the node 20, 30 computes the control input $\Delta I_R(t)$ at time t, the node 20, 30 computes $K_{S,R,T_{S,R}}(t+1)$ so that:

$$\begin{cases} K_{S,R,T_{S,R}}(t+1) = K_{S,R,T_{S,R}}(t), & \text{if } \Delta I_R(t)=0 \\ K_{S,R,T_{S,R}}(t+1) > K_{S,R,T_{S,R}}(t), & \text{if } \Delta I_R(t)<0 \\ K_{S,R,T_{S,R}}(t+1) < K_{S,R,T_{S,R}}(t), & \text{if } \Delta I_R(t)>0 \end{cases}$$

and that $|\Delta I_R(t)|$ is equal to the expected interference that the nodes in either $E_{S,R,T_{S,R}}(t)$ or $E_{S,R,T_{S,R}}(t+1)$, but not in both, introduce to the sensor 20 when the PRK model parameter is $\min\{K_{S,R,T_{S,R}}(t), K_{S,R,T_{S,R}}(t+1)\}$. To realize this, the expected interference $I_{C,R}(t)$ that the concurrent node C introduces to the receiving node R when the concurrent node C is not in the exclusion region of the receiving node R for each concurrent node C is defined in the local region around the receiving node R. Based on this definition, then, $I_{C,R}(t) = \beta_C(t) P_{C,R}(t)$, where $\beta_C(t)$ is the probability for the concurrent node C to transmit data packets at time t and $P_{C,R}(t)$ is the power strength of the data signals reaching the receiving node R from the concurrent node C. As is discussed below $P_{C,R}(t)$ and $\beta_C(t)$ can be estimated through purely local coordination between the receiving node R and the concurrent node C. Considering the discrete nature of node distribution in space and the requirement on satisfying the minimum link reliability $T_{S,R}$, the following rules for computing $K_{S,R,T_{S,R}}(t+1)$ are utilized in the PRKS control protocol:

When $\Delta I_R(t)=0$, let $K_{S,R,T_{S,R}}(t+1) = K_{S,R,T_{S,R}}(t)$.

When $\Delta I_R(t)<0$ (i.e., when the exclusion region should be expanded, FIG. 4a), let $E_{S,R,T_{S,R}}(t+1) = E_{S,R,T_{S,R}}(t)$, then keep adding nodes not already in $E_{S,R,T_{S,R}}(t+1)$, in the non-increasing order of their data signal power at R, such that adding B into $E_{S,R,T_{S,R}}(t+1)$ makes:

$$\sum_{C \in E_{S,R,T_{S,R}}(t+1) \setminus E_{S,R,T_{S,R}}(t)} I_{C,R}(t) \geq |\Delta I_R(t)|$$

for the first time. Then let $$K_{S,R,T_{S,R}}(t+1) = \frac{P(S, R, t)}{P(B, R, t)}.$$

When $\Delta I_R(t)>0$ (i.e., when the exclusion region should be shrunk, FIG. 4b), let $E_{S,R,T_{S,R}}(t+1) = E_{S,R,T_{S,R}}(t)$, then keep removing nodes in $E_{S,R,T_{S,R}}(t+1)$, in the non-decreasing order of their data signal power at R, out of $E_{S,R,T_{S,R}}(t+1)$ until the node B such that removing any more nodes after removing B makes $$\sum_{C \in E_{S,R,T_{S,R}}(t) \setminus E_{S,R,T_{S,R}}(t+1)} I_{C,R}(t) > |\Delta I_R(t)|$$

for the first time. Then let $$K_{S,R,T_{S,R}}(t+1) = \frac{P(S, R, t)}{P(B, R, t)}.$$

Figure 4A:
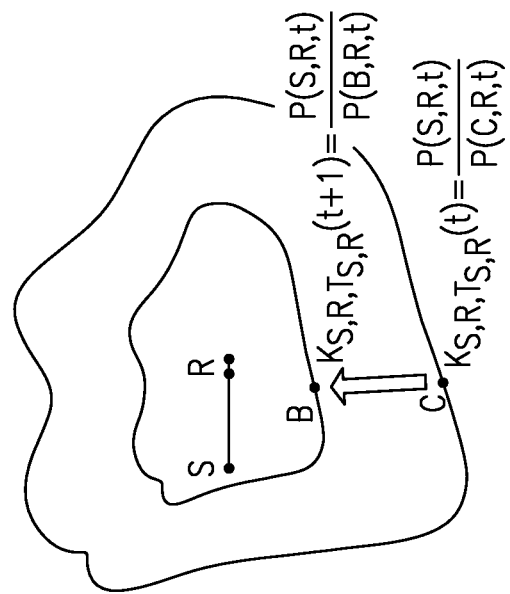
FIG. 4a illustrates an expanding exclusion region around a receiver node.
Figure 4B:
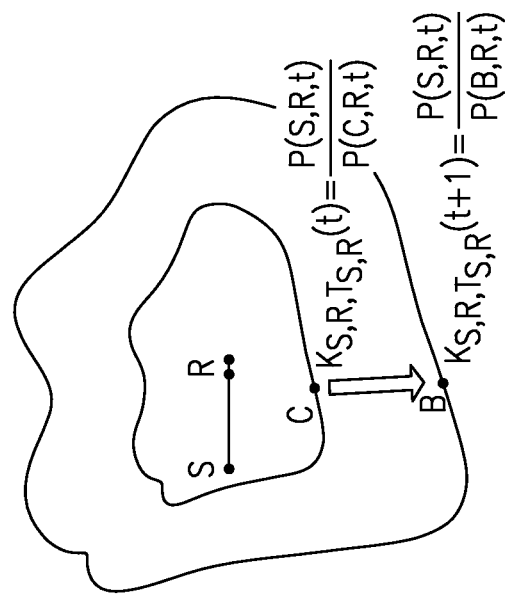
FIG. 4b illustrates a shrinking exclusion region around a receiver node.

FIG. 4a illustrates the above described concept for cases $\Delta I_R(t)<0$ with the exclusion region increasing. FIG. 4b illustrates the above described concept for cases of $\Delta I_R(t)>0$ with the exclusion region decreasing. The exclusion region is defined by lines B and C and defines the approximate signal strength region around a receiving sensor R in which concurrent transmissions are excluded. In a practical implementation, sensors 20 are within or outside of the exclusion region based on signal strength and not strictly based on relative geographic positioning. In one example, the initial value of the PRK model parameter is set such that the initial exclusion region around R includes every node whose transmission alone, concurrent with the transmission from S to R, can make the link reliability drop below $T_{S,R}$.

Figure 5:
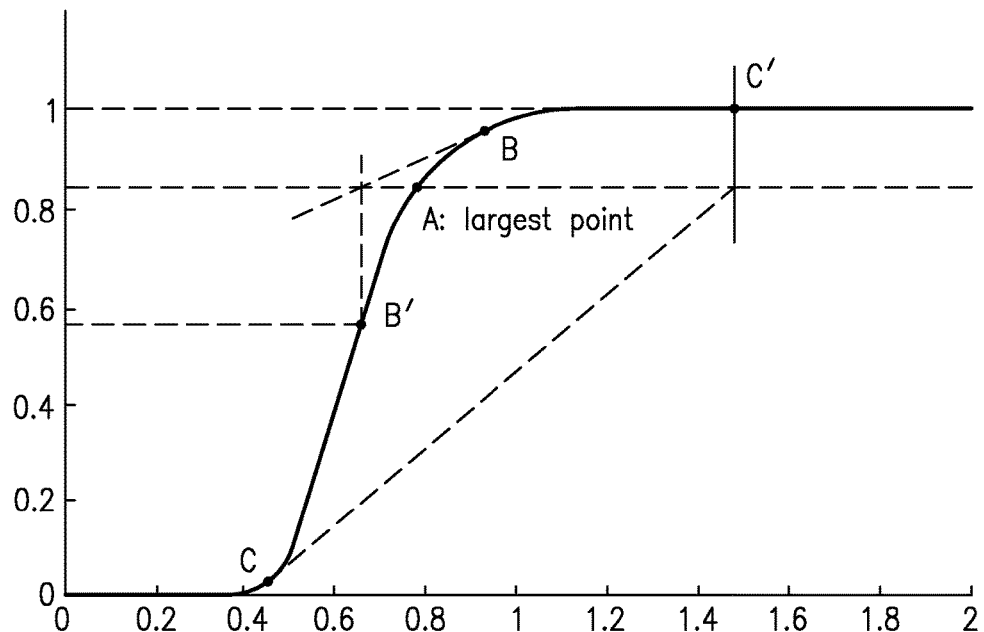
FIG. 5 illustrates a stability curve of an adaptive controller in the PRKS protocol.

The controller designs and analysis based on the linear model are more accurate when y(t) is closer to $T_{S,R}$. When y(t) is far away from $T_{S,R}$, directly using the linear model can lead to significant undershoot or overshoot in feedback control. FIG. 5 illustrates a stability curve of an adaptive controller.

Assuming the target operating point is A where the link reliability is $T_{S,R}$ in FIG. 5, for instance, applying the linear model and the minimum variance controller when the operating point is B at time t results in $E[y(t+1)]=T_B$, which is significantly lower than $T_{S,R}$ and leads to significant undershoot. Similarly, applying the linear model and the minimum variance controller when the operating point is C at time t results in $E[y(t+1)]=T_C$, which is significantly higher than $T_{S,R}$ and thus lead to significant overshoot. Significant undershoot or overshoot may lead to network-wide instability in feedback control due to the coupling between individual links via $\Delta I_U(t)$. For stability and for avoiding significant undershoot and overshoot in control, a(t) is replaced with a refined version a(t) (defined below) in some practical controller implementations.

$$a_r(t) = \begin{cases} a(t), & \text{if } |y(t) - T_{S,R}| \leq e_0 \\ a_0, & \text{if } |y(t) = T_{S,R}| > e_0 \end{cases}$$

where $e_0$ is a threshold value for the linear model to be accurate around the neighborhood of $T_{S,R}$, and $$a_0 = \left| \frac{T_{S,R} - y(t)}{f^{-1}(T_{S,R}) - f^{-1}(y(t))} \right|$$

is the gradient of the line connecting the current operating point y(t) and the target point $T_{S,R}$ on function f. Letting $a(t)=a_0$ when $|y(t)-T_{S,R}|>e_0$ avoids overshoot and undershoot in the feedback control of $K_{S,R,T_{S,R}}(.)$ at link (S, R), thus preventing $Y_{S,R}(.)$ from oscillating around $T_{S,R}$ for a given disturbance $\Delta I_U(.)$ and enabling network-wide convergence in the regulation control.

Note that the functional form of f in the theoretical model, and thus its gradient, are more stable than the specific realization of f (e.g., specific mapping between $Y_{S,R}$ and $P_{S,R}-I_R$) across different network and environmental conditions; hence letting $a_r(t)$ be a(t) instead of $a_0$ when $|y(t)-T_{S,R}| \leq e_0$ helps address the inaccuracy of the theoretical model in practice. In one practical implementation, $e_0$ is 5%.

Turning our attention now to the development of a local signal map for each node 20, 30 in the distributed sensing and control network 10 illustrated in FIG. 1, given a link (S, R) and a specific instantiation of the PRK model in the controllers 24 of the sensors 20 and the controller 30, the parameter $K_{S,R,T_{S,R}}(t)$ defines the exclusion region $E_{S,R,T_{S,R}}(t)$ around the receiver R such that a concurrent node C is within the exclusion region if, and only if, $$P(C, R, t) \geq \frac{P(S, R, t)}{K_{S,R,T_{S,R}}(t)}.$$

In theoretical PRKS protocol scheduling, every concurrent node within the exclusion region is aware of its existence in the exclusion region and does not transmit concurrently with the reception at the receiving node R. Yet it is difficult to ensure this property due to the following real-world complexities in wireless communication: 1) the concurrent node C may be located beyond the communication range of the receiving node R such that the receiving node R cannot inform the concurrent node C about its state (e.g., the value of $$\frac{P(S, R, t)}{K_{S,R,T_{S,R}}(t)})$$

with the regular data transmission power. 2) Wireless communications may be anisotropic such that it is difficult for the receiving node R to transmit protocol signaling messages (e.g., a CTS-type message) that reaches, and only reaches, nodes within the exclusion region. 3) Wireless communications may be asymmetric such that nodes interfering with one another may not know one another's state $$(\text{e.g.,} \frac{\overline{P}(S, R, t)}{K_{S,R,T_{S,R}}(t)},$$

receiving or idle).

To address these challenges, in the instantiated PRKS protocol of FIG. 1, every node R maintains a local signal map within a local memory that contains the average signal power attenuation between node R and every concurrent node C close-by. To measure the signal power attenuation, P', from a concurrent node C to another node R, the concurrent node C informs node R of its transmission power $P_C$ by piggybacking the information onto its packets to node R, and then node R derives the power attenuation as long as node R can estimate the power of the received signals from the concurrent node C, denoted by $P_{C,R}$. To this end, node R can sample the RSSI value $P_{total}$ at an instant immediately before finishing receiving a packet from the concurrent node C. Immediately after receiving the packet, node R samples the RSSI value $P_I$ again.

Figure 6:
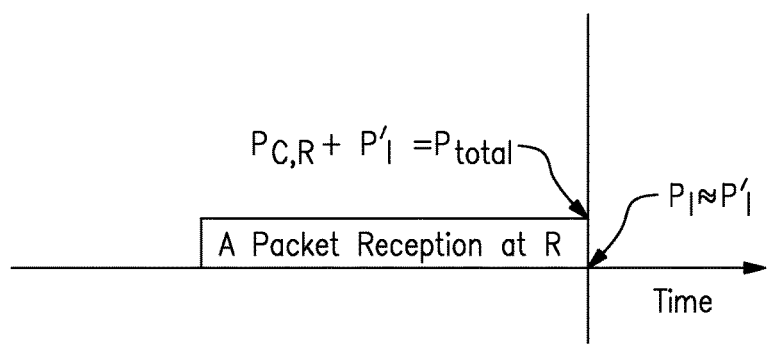
FIG. 6 illustrates an estimation of signal power attenuation.

FIG. 6 illustrates an estimation of signal power attenuation. As shown in FIG. 6, $P_I$ is the sum of the background noise power and the interference power at R right after the packet reception, and $P_{total}=P_{C,R}+P_I'$ where $P_I'$ is the sum of the background noise power and the interference power at R right before the packet reception. The signal maps are maintained in the control plane of the PRKS protocol where wireless channel access is based on a known random access method CSMA/CA. Given that $P_{total}$ and $P_I$ can be sampled at a very short interval (e.g., less than 0.01 milliseconds), and that the background noise power as well as the interference power do not change much in such short intervals in CSMA/CA-based wireless networks, the sum of the background noise power and the interference power do not significantly change immediately before and immediately after a packet reception. In other words, $P_I'$ and $P_I$ are approximately the same.

Thus, $P_{C,R}=P_{total}-P_I'$ is approximately equal to $P_{total}-P_I$. Once the receiving node R acquires a sample of $P_{C,R}$, node R can compute a sample of $P'_{C,R}$ as $P'_{C,R}=P_C-P_{C,R}$.

In this manner, node R can get a series of samples of $P'_{C,R}$ and then use these samples to derive the average signal power loss from the concurrent node C to itself. Using the above method, nodes close-by can establish their local signal maps through purely local sampling of their packet receptions without any global coordination in the network, and the local signal maps generated in this manner are accurate.

Note that the local signal map maintains power attenuation from a concurrent node C to a receiving node R instead of simply the reception power of signals from node C to node R so that the local signal map can be used to estimate the reception power of signals that are transmitted at different powers (e.g., for the control signals of protocol PRKS). For protocol signaling in PRKS, the local signal maps also maintain bi-directional power attenuation between a pair of close-by nodes. After estimating $P'_{C,R}$, for instance, the receiving node R also informs the concurrent node C of $P'_{C,R}$ so that node C is aware of the power attenuation from itself to node R.

Turning our attention now to protocol signaling based on signal maps, the local signal map at node R records signal power attenuation between node R and the nodes close-by. Using this information and known transmission power control algorithms, node R can broadcast signaling packets at an appropriate power level such that these packets with the value of $$\frac{P(S, R, t)}{K_{S,R,T_{S,R}}(t)}$$

can be received with high probability by all the nodes in the exclusion region ($E_{S,R,T_{S,R}}(t)$) around node R. This is accomplished even if a concurrent node C within the exclusion region is beyond the regular data communication range of node R, in which case, the broadcast packets are transmitted at a power higher than the regular data transmission power. Therefore, the local signal map addresses the challenge of large interference range through transmission power control.

To further increase the reliability of protocol signaling, node R can broadcast each signaling packet multiple times, and nodes in the exclusion region of node R can rebroadcast the signaling packet they hear from node R. To reduce the delay in information sharing, signaling packets with fresher information (i.e., information that has been transmitted for fewer number of times) also have higher priorities in channel access by using smaller contention windows in CSMA/CA.

When a concurrent node C receives the signaling packet from node R, node C can use its local signal map to decide whether the transmission may interfere with the transmission from a sending node S to a receiving node R (i.e., whether the concurrent node C is within the exclusion region) by checking whether $$P(C, R, t) \geq \frac{P(S, R, t)}{K_{S,R,T_{S,B}}(t)}.$$

Therefore, the signaling packets can reach nodes not in the exclusion region without falsely including those nodes into the exclusion region, thus addressing the challenge of anisotropic wireless communication. Similarly, using power control algorithms and local signal maps, a pair of nodes C and R can inform each other of their respective states (e.g., the PRK model parameter) using different transmission powers for signaling packets, thus addressing the challenge of asymmetric wireless communication in protocol signaling.

For the correctness of the above protocol signaling method, the signal map of a node R includes a set E' of nodes whose transmission may interfere with the reception at R or whose reception may be interfered by the transmission of R.

E' is the set of nodes within the exclusion region of node R. Since the set E' is dynamic and uncertain depending on network and environmental conditions, the node R dynamically adjusts the set of nodes in its local signal map through local coordination with nodes close-by, and node R may also maintain a relative large signal map to include the nodes that may be in E' over time. Together with the PRK model instantiation method discussed above, the above field-deployable signaling mechanisms enable agile, high-fidelity identification of interference relations among nodes, thus bridging the gap between the theory of pairwise-interference-model-based scheduling and the practical implementation of these algorithms.

Two basic tasks of PRKS protocol in interference control are 1) enabling nodes to be accurately aware of the mutual interference relations among themselves and 2) controlling channel access so that no two interfering links use the same wireless channel at the same time. These tasks make the commonly used single-channel contention-based approach unsuitable for PRKS protocol interference control for the following reasons:

First, in contention-based channel access control, each data transmission is preceded by a protocol signaling phase either implicitly through carrier sensing or explicitly through a RTS-CTS handshake. Due to the probabilistic nature of wireless communication and the potentially large interference range, it is difficult to make such per-transmission protocol signaling predictably reliable even with the mechanisms discussed above. Accordingly, it is difficult for nodes to be accurately aware of their mutual interference relations and one another's operation states (e.g., transmission or not), and it is thus difficult to control interference between the nodes in a predictable manner.

Second, even if the per-transmission protocol signaling is more predictably reliable through mechanisms such as retransmission of signaling packets, this introduces significant delay and overhead for each data transmission. Even worse, the signaling packets may be transmitted at relatively higher power to ensure coverage of the potentially large exclusion regions, and the high-power transmissions of signaling packets introduce significant interference to the data transmissions themselves. In trying to ensure the required data delivery reliability in the presence of strong interference from protocol signaling, nodes will adapt their PRK model parameter to expand their individual exclusion regions, which in turn requires the signaling packets to be transmitted at even higher power and thus leads to system instability.

To address the aforementioned challenges, protocol signaling is decoupled from data transmission. Given a link (S, R), highly accurate estimation of its reliability usually requires the knowledge of the transmission status of several data transmissions along (S, R). In some examples, estimation of reliability requires knowledge of the transmission status of as many as 20 data transmissions. Accordingly, it takes time to get a new link reliability feedback, and the timescale of PRK model adaptation as well as the resulting change in interference relations between (S, R) and close-by nodes/links is much longer than the timescale of individual data transmissions along (S, R). After each PRK model adaptation, the receiver R can inform the relevant nodes of the new value of parameter $K_{S,R,T_{S,R}}$ and thus the corresponding change in interference relations using the protocol signaling mechanisms discussed above. Each new value of $K_{S,R,T_{S,R}}$ can be reliably and quickly signaled within 1.4 transmissions of the signaling packet on average. Therefore, instead of requiring perfectly reliable signaling for each data transmission as in contention-based channel access control, protocol signaling is treated as an independent process which ensures timely awareness of the mutual interference between nodes/links. Based on the latest information of mutual interference relations, data transmissions can be scheduled in a TDMA fashion without being coupled with protocol signaling. Furthermore, the periodic sampling of physical processes in WSC networks also makes TDMA an efficient scheduling mechanism as compared with contention-based approaches.

Besides enabling precise awareness of mutual interference relations, the decoupling of protocol signaling and data transmission also enables the transmission of signaling packets and data packets in different wireless channels, thus avoiding the interference between protocol signaling and data transmission as well as the corresponding system instability. The wireless channels used for protocol signaling and data transmission are referred to as the control channel and the data channel respectively. Using a control channel is necessary for avoiding system instability while addressing the challenges of protocol signaling at the same time. Since protocol signaling does not introduce high traffic load, it may well be able to reuse the control channel that has been set aside in industry standards such as IEEE 1609.4.

Figure 7:
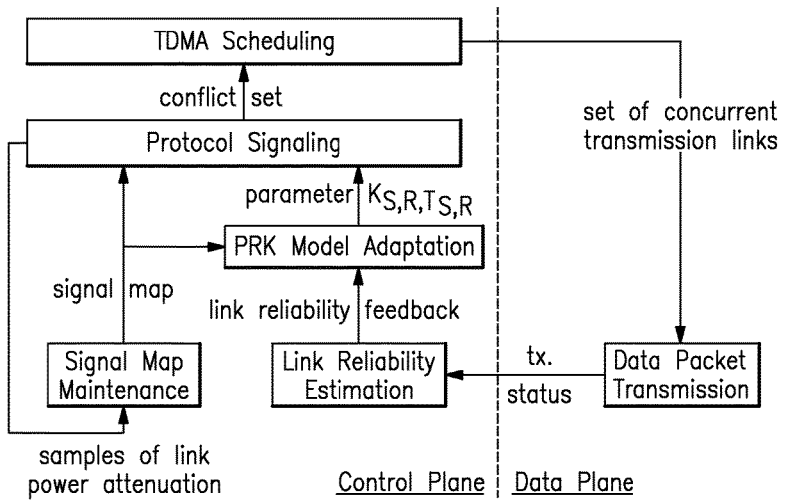
FIG. 7 illustrates an architecture for a PRKS system.

Based on the above principles, FIG. 7 illustrates a scheme for a practical PRKS protocol based system. To address the above challenges, PRKS separates the functionalities of PRK-based channel access control into control plane functions and data plane functions as shown in FIG. 7. In the control plane, the sender node S and the receiver node R of a given link (S, R) learn the set of links whose transmissions cannot take place concurrently with the transmission from node S to node R through the protocol signaling mechanisms presented above. This set of links is defined as the conflict set of link (S, R). More specifically, a link (C, D) is in the conflict set of (S, R) and thus conflicting with (S, R) at a time instant t if node C is within the exclusion region of node R or node S is within the exclusion region of node D.

Based on the conflict sets of links, data transmissions along individual links can be scheduled in a distributed, TDMA manner according to a Link-Activation-Multiple-Access (LAMA) algorithm. With the LAMA algorithm, the link (S, R) is regarded as active in a time slot if node S transmits to node R in the slot. Given a time slot, the sender node S and the receiver node R of link (S, R) first compute the priorities for the link (S, R) and the links in the conflict set of (S, R) to be active in the time slot, then S decides to transmit to R and R decides to receive data from S if and only if, for this time slot, (S, R) has higher priority to be active than every conflicting link.

Every node in the distributed sensing and control network computes link activation priorities in the same manner such that no two conflicting links will be active in the same time slot as long as links are accurately aware of their mutual interference relations. If a link (S, R) is active in a time slot, node S will transmit data packet(s) to node R in this time slot. The status (i.e., successes or failures) of data transmissions in the data plane are fed back into the control plane for estimating the in-situ link reliabilities, which in turn triggers PRK model adaptation and then the adaptation of the TDMA transmission scheduling accordingly. In the control plane, nodes also leverage the transmissions and receptions of protocol signaling packets to maintain their local signal maps as disclosed above. Given that the instantiated PRK models precisely identify the conflict sets of individual links, the TDMA scheduling in the PRKS protocol also eliminates hidden terminals and exposed terminals.

To avoid interference between protocol signaling transmissions and data transmissions, protocol signaling packets and data packets are transmitted in different wireless channels, regarded as the control channel and the data channel respectively. By default, a node stays in the control channel. At the beginning of a time slot, every node executes the OLAMA scheduling algorithm to check whether any of its associated links will be active in this time slot.

If one of the associated links is active in this time slot, the node switches to the data channel for data transmission or reception depending on whether the node is the transmitter or receiver of the associated active link. After the data transmission/reception, the node switches back to the control channel, and, if the node is a receiver of a link in this time slot, the node feeds back the status (i.e., success or failure) of this transmission to the control plane for link reliability estimation and the corresponding PRK model adaptation if a new link reliability estimate is generated. If the node is not involved in any data transmission/reception in the time slot, the node stays in the control channel, and tries to access the control channel via CSMA/CA.

If the node wins channel access (e.g., sensing the channel as idle), the node transmits a signaling packet including information on the PRK model parameters for all of the node's associated links and their conflicting links. If the node does not win channel access, the node stays in the control channel receiving signaling packets from other nodes and perform functions related to signal map maintenance and protocol signaling. The length of a time slot is pre-determined such that the aforementioned actions can be completed in a single time slot whether the node is involved in control plane functions alone or the node is also involved in a data transmission/reception.

In an alternate example, to activate as many links as possible while ensuing collision-free scheduling, an Optimized Link-Activation-Multiple-Access (OLAMA) scheduling protocol is utilized. The OLAMA protocol formulates the scheduling problem into finding a maximal independent set (MIS) in the conflict graph The conflict graph is defined such that the nodes are the data-transmission-links to be scheduled, and there is a link between two nodes in the conflict graph if the corresponding data-transmission-links conflict with each other. In graph theory, an independent set is a set of nodes in a graph, none of which are adjacent. An independent set is maximal if adding any other node makes it no longer an independent set. OLAMA utilizes a distributed MIS (DMIS) algorithm, which identifies a MIS of the conflict graph given all node priorities. The node priorities in OLAMA are calculated the same way as they are for the link priorities in the LAMA example. In the ensuing explanation of OLAMA, the discussion is based on the conflict graph such that, by "node", we mean a corresponding "data transmission link".

LAMA can compute the schedule for each slot on the fly because it requires no packet exchange for the computation. By contrast, it takes multiple rounds of packet exchange for DMIS to find the schedule (i.e., MIS) for a given time slot. Furthermore, the wireless channel is susceptible to packet loss. If OLAMA computes the schedule on the fly, significant delays are introduced for data delivery, especially in large networks. To reduce the delay incurred by MIS computation while activating as many nodes as possible, OLAMA decouples the computation of MIS from data transmission by precomputing MIS in advance for each time slot. When a certain slot comes, OLAMA looks up the precomputed MIS on the fly and activates a node if and only if it is in the MIS. To further reduce delay, OLAMA organizes the precomputation of MIS's for consecutive slots in a pipeline.

In the OLAMA algorithm, as many nodes as possible are activated while still ensuring no two neighboring nodes are active simultaneously. In other words, a maximal independent set of a graph in each slot are activated through a distributed MIS (DMIS) algorithm, described as follows.

In DMIS, a node stays in one of three states, UNDECIDED, ACTIVE and INACTIVE, at any given time. In the UNDECIDED state, the node has not decided whether to join the MIS or not. In the ACTIVE state, the node joins the MIS. In the INACTIVE state, the node does not join the MIS.

Initially, all nodes are UNDECIDED. In any slot t, each node computes the priority of itself and its neighbors according to the following equation:

$$p_i = \text{Hash}(i \oplus t) \oplus i.$$

In the above equation, i is a node id, Hash(x) is a fast message digest generator that returns a random integer by hashing x, and $p_i$ is i's priority. $\oplus$ concatenates the two operands i and t. The second $\oplus$ guarantees all nodes' priorities are distinct even when Hash( ) returns the same number on different inputs. Based on the priority for each node, DMIS computes a MIS for slot t in multiple phases. Each phase has three steps:

First, a node v exchanges nodal states with its neighbors.

Second, if the node v's priority is higher than all its ACTIVE and UNDECIDED neighbors, it enters the MIS by marking itself ACTIVE; conversely, if any of its higher priority neighbors is ACTIVE, it marks itself INACTIVE.

Third, the node v proceeds to the next phase only if its state remains UNDECIDED after the second step.

When no node remains UNDECIDED, the algorithm terminates. The resulting MIS is the set containing all ACTIVE nodes, which are to be activated in slot t. It is noteworthy that exchanged nodal state does not include priority, which is computed locally even for neighbors'. One of skill in the art will recognize that DMIS's expected running time is $O(\log(n))$ phases, where n is the number of nodes in the conflict graph.

The LAMA algorithm requires no packet exchange to compute a schedule and can thus be called on the fly. In a TDMA setting, a node can call LAMA as a subroutine at the beginning of a slot to instantaneously determine if the node should be active in that slot. Doing the same for DMIS is difficult because, unlike LAMA, running DMIS requires multiple phases and each phase incurs delay mainly due to contention to access the shared channel and unreliable channel in the first step. The resulting delay for data delivery is undesirable for a wide range of time-sensitive applications.

To reduce DMIS's delay while retaining its high concurrency, the DMIS is decoupled from data transmission by precomputing MIS of a slot M slots in advance. The value of M is chosen such that DMIS converges within M slots, at least with high probability. In slot t, DMIS starts computing MIS for a future slot (t+M) using the nodes' priorities at slot (t+M). The intermediate result, i.e., the current MIS, is stored until slot (t+M). When time reaches slot (t+M), a node simply looks up the precomputed MIS and decides to become active or inactive, without computing it on the fly as in LAMA. Since it takes M slots to compute the MIS for each slot, in slot t, MIS's for slot (t+1); (t+2); : : : ; (t+M) are being computed. The computations are organized into a pipeline, where the MIS computation of consecutive M slots overlaps. This is more efficient than computing them sequentially. Moreover, a vector of M states is aggregated and the states are exchanged in a single control packet at once, rather than conveying each of the M states using a separate packet. This greatly saves channel resources.

Figure 8:
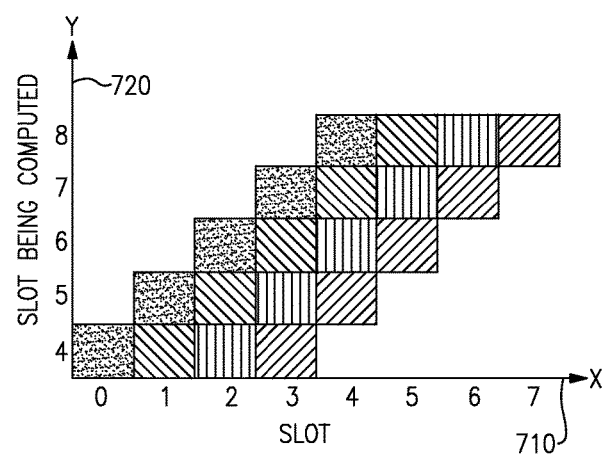
FIG. 8 shows an example of a proposed precomputed pipeline.

FIG. 8 shows an example of the proposed precomputed pipeline in action when M is four. The x-axis 710 denotes time in slot, the y-axis 720 denotes the slot whose MIS is being computed. The computation of MIS for slot four starts at slot zero and continues in slots one, two, and three. In slot four, the MIS has been precomputed and is ready for immediate activation. Similarly, the MIS for slot five is ready at slot five, MIS for slot six is ready at slot six, and so on. In slot three, the MIS's for the upcoming slots four, five, six and seven are being computed simultaneously.

The graph changes over time as nodes join or leave the network, links establish, or links break. Without further modification, the change in the graph confuses DMIS because DMIS assumes the graph remains static before it converges. The confusion is removed using a snapshot-based approach. Specifically, when starting to compute the MIS for a future slot (t+M) in slot t, we take a snapshot of the graph and use the snapshot for the remaining computation even if the graph changes within M slots. Hence, the graph is consistent for each call of DMIS. One potential side effect of this approach is that OLAMA defers the usage of the latest graph, which may degrade application performance at upper layer. Even if degradation occurs, the degradation can be mitigated by making M smaller.

A typical embedded device is equipped with limited memory. Implementing OLAMA on such resource-constrained devices poses an additional challenge that is not found on resource-rich ones. To overcome this challenge, we expose several key parameters for fine tuning to let upper layer trade off between memory usage and performance. There are two places in the OLAMA algorithm and process that can expend significant amount of memory, especially when used in a large network.

First, when each node maintains a table containing all its potential neighbors with size L. To store graph snapshot for each slot, a node needs one bit for each node in its neighbor table, indicating whether they interfere or not. It thus costs each node L*M bits to store local graph snapshots. To reduce the footprint of the snapshot, we take snapshots every other G slots, instead of every slot. After each snapshot, DMIS uses it to compute the MIS of the next G consecutive slots, where G is a calibration variable determinable by one of skill in the art. This reduces snapshot footprint by a factor of G. In some instances, a larger G is not always desirable since the larger G makes the protocol less agile to graph change. G can be tuned by one of skill in the art to strike a balance between memory consumption and protocol agility.

Second, in the first step of a phase in DMIS, a node exchanges states with its neighbors by sending and receiving control packets. The control packets can piggyback upper layer payload as well if space permits. Each slot is further divided into S subslots, out of which one slot is reserved for data packets and the remainder of the slots are reserved for control packets. Only one data or control packet can be transmitted in each subslot. In total, each node stores L*M intermediate states for pipelined precomputation. On the one hand, because a fixed number of control packets are needed for the convergence of DMIS for a slot on a given graph, a larger S packs more control packets into a slot and thus lessens M and memory expenditure. On the other hand, a larger S also increases control overhead and lowers channel utilization for data delivery. A judicious selection of M again depends on memory consumption and performance tradeoff, and is determinable by one of skill in the art.

With the above approaches to PRKS protocol, the TDMA scheduling of data transmissions happens at the beginning of each time slot based on the PRK model information that is readily available in the control plane, hence there is no need for ensuring predictably reliable protocol signaling on a per transmission basis and thus no delay introduced on a per transmission basis just for protocol signaling. Given that the timescale of PRKS model adaptation at a link (S, R) is much longer than the timescale of individual data transmissions along (S, R), in particular, the time instants $t_a$ and $t_b$ for two consecutive PRK model adaptations at (S, R) tend to be well separated such that, within the early part of the time window $[t_a, t_b]$, the PRK model parameter of link (S, R) generated at time t, can be reliably delivered to the relevant nodes and then be used for the TDMA scheduling of data transmissions.

One premise for the correct operation of PRKS is that, for every link (S, R), the sender node S and the receiver node R always use the same PRK model parameters of the relevant links when deciding whether (S, R) should be active in a time slot. Otherwise, node S and node R may derive different conflicting relations between links, and node S may think (S, R) shall be active for this time slot and switch to the data channel to transmit, but node R thinks (S, R) shall be inactive and stays in the control channel, which makes node R unable to receive the transmitted data from node S and leads to data packet loss.

Since protocol signaling takes time (especially considering the probabilistic nature of wireless communication) there are time periods when node S and node R may have inconsistent information about the PRK model parameters in the network. For instance, when node R changes the PRK model parameter $K_{S,R,T_{S,R}}(.)$ at time $t_R$ by executing the minimum variance controller, the new model parameter $K_{S,R,T_{S,R}}(t+1)$ is known by node R immediately, but it takes time for node R to share this information with the transmitter node S through protocol signaling. This delay in protocol signaling is denoted as $d_{R,S}$. Similarly, when another potentially conflicting link (C, D) changes its PRK model parameter to $K_{C,D,T_{C,D}}(t+1)$, nodes S and R may learn of $K_{C,D,T_{C,D}}(t+1)$ for the first time at different time $t'_S$ and $t'_R$ respectively, and it may well take time $d'_{S,R,C,D}$ and $d'_{R,S,C,D}$ for S and R to inform each other of their knowledge respectively. Note that $t'_S$ and $t'_R$ may be ∞ if nodes S and R do not learn of $K_{C,D,T_{C,D}}(t+1)$ at all.

To address these challenges, the PRKS protocol employs the concept of activation time of a PRK model parameter as follows:

When the latest PRK model parameter $K_{S,R,T_{S,R}}(t+1)$ is generated by receiver node R at time $t_R$, the activation time of $K_{S,R,T_{S,R}}(t+1)$ at link (S, R) is defined as $t_R+d_{R,S}$. Starting at time $t_R$, nodes S and R continue using the previous parameter value $K_{S,R,T_{S,R}}(t)$ until the activation time $t_R+d_{R,S}$ after which S and R use the parameter value $K_{S,R,T_{S,R}}(t+1)$.

When nodes S and R of the link (S, R) learn of the latest PRK model parameter $K_{C,D,T_{C,D}}(t+1)$ of a potentially conflicting link (C, D) for the first time at time $t'_S$ and $t'_R$, respectively, the activation time of $K_{C,D,T_{C,D}}(t+1)$ at link (S, R) is defined as $\min\{t'_S+d'_{S,R,C,D}, t'_R+d'_{R,S,C,D}\}$. Nodes S and R continue using the PRK model parameter $K_{C,D,T_{C,D}}(t)$ until the activation time $\min\{t'_S+d'_{S,R,C,D}, t'_R+d'_{R,S,C,D}\}$, after which nodes S and R use the parameter value $K_{C,D,T_{C,D}}(t+1)$.

With this approach, the sender-receiver (S-R) consistency is guaranteed such that the sender and the receiver of a link always use the same PRK model parameters in the TDMA scheduling. In practice, the protocol signaling delays $d_{R,S}$, $d'_{S,R,C,D}$, and $d'_{R,S,C,D}$ are all random instead of deterministic, and we can use their upper-quantile values (e.g., maximum or 0.9 quantile) in defining activation time. In one implementation of the PRKS protocol, the 0.95 quantiles of the signaling delays are used.

An alternative approach to addressing the transient information consistency between a sender S and its receiver R is as follows based on sender-receiver coordination.

If the link (S, R) shall be active in a time slot to, the sender S computes the time slot $t_1$ when the link (S, R) will be active again the next time. Then the sender S piggybacks the value of $t_1$ onto the data packet, if any, to be transmitted to the receiver R at to as well as onto every protocol signaling packet that the sender S may transmit during to and $t_1$. If the receiver R receives a data or a protocol signaling packet from the sender S showing that the sender S will transmit in a future time slot $t_1$, the receiver R will stay in the data channel at $t_1$ even if the local execution of the LAMA (or OLAMA) algorithm at R may show link (S, R) as inactive at $t_1$.

After computing at time to the next time slot $t_1$ to transmit to the receiver R, the sender S will not transmit in the receiver R at any time slot $t_1' \epsilon (t_0, t_1)$ unless the receiver R tells the sender S to transmit at $t_1'$ as we discuss next. This rule applies even if the local PRK model parameters at the sender S shows at slot $t_1'$ that the link (S, R) shall be active at this time slot. This rule implicitly introduces delay in using the latest information on PRK model parameters, but this delay is significantly less than a delay in an approach based on perfect consistency between the sender S and the receiver R as we have discussed.

After the receiver R learns that the sender S will transmit in a future time slot $t_1$, if the execution of the LAMA (or OLAMA) algorithm at the receiver R at a time slot $t_0'$ shows that the link (S, R) shall be active at a time slot $t_1' < t_1$ and if the time window of [$t_0'$, $t_1'$] is long enough for the receiver R to successfully inform the sender S of the value of $t_1'$ with high probability, the receiver R changes its local value of $t_1$ to $t_1'$ and piggybacks the value of $t_1'$ onto packets (e.g., protocol signaling packets) that the receiver R may transmit during [$t_0'$, $t_1'$). If the sender S receives a packet from the receiver R showing that link (S, R) shall be active at a future time slot $t_1' < t_1$, the receiver R changes the value of $t_1$ to $t_1'$. This rule is to ameliorate the implicit delay in using the latest PRK parameter values that the previous rule may introduce.

If the receiver R does not receive any data packet from the sender S at the time slot $t_1$ (e.g., due to data packet loss), the receiver R enters and stays in the "conservative" state until it receives a packet from the sender S again showing that (S, R) shall be active at another future time slot. While in the "conservative" state, the receiver R stays in the data channel for a time slot $t_2$ as long as, at $t_2$, the link (S, R) has higher priority to be active than other links associated with the receiver R. The conservative state ensures that the receiver R is in the data channel whenever the sender S transmits a data packet to the receiver R, and it enables the receiver R to be synchronized with the sender S on the data-transmission schedule again.

In the system boot-up phase, the sender S executes the basic LAMA (or OLAMA) algorithm and the receiver R remains in the conservative state when deciding whether to stay in the data or control channel for a time slot, until the sender S transmits for the first time and the receiver R receives a first packet from the sender S respectively.

With the above coordination mechanism, the receiver R is guaranteed to be in the data channel whenever the sender S transmits data packets. In the meantime, the receiver R stays in the control channel often enough to be updated with the latest PRK model parameters of close-by links.

The aforementioned coordination between a sender S and its receiver R is the only inter-node coordination needed to address the potential inconsistency on the PRK model parameters during transient periods. In particular, perfect information consistency that requires the same PRK model parameter of a link (S, R) is not necessary to be used by link (S, R) and all the links whose transmitters are in the exclusion region around receiver R. That is, as long as the sender-receiver consistency is ensured, a node can use the new PRK model parameter of a link the moment the node learns of the parameter. Thus, as long as the sender-receiver consistency is ensured, the earliest use of new PRK model parameters helps improve data delivery reliability when the corresponding exclusion regions expand, or it helps improve the spatial reuse and concurrency of data transmissions when the corresponding exclusion regions shrink.

While the above disclosure has focused on the exclusion regions around receivers alone, it is understood that similar processes and methods would apply to transmitters (senders). If it is important to ensure ACK reliability at the link layer (e.g., for avoiding unnecessary retransmissions), similar approaches to protecting data receptions can be applied to protect ACK receptions by maintaining an exclusion region around the transmitter of each link.

The above disclosure focuses on unicast where a sender S wants to transmit data packets to a receiver R. The mechanisms presented above, however, are readily extendable to enable broadcast/multicast where a sender S wants to reliably transmit data packets to a set of receivers at the same time. In the control plane, for instance, the sender S can use a high-power signal to explicitly identify the exclusion regions around the set of receivers so that no node in any of the exclusion regions transmits concurrently with the broadcast/multicast transmission by the sender S.

The above discussion is also directed toward mostly static wireless sensing and control networks. The basic mechanisms presented above are readily extendable to support predictable link reliability in mobile wireless sensing and control networks such as for groups of vehicles. In mobile wireless sensing and control networks, node mobility introduces dynamics in node spatial distribution and thus dynamics in wireless communication. In particular, dynamics in node spatial distribution increases the dynamics in signal power attenuation between nodes, which challenges the maintenance of local signal maps and the adaptation of the PRK model.

To address the challenge in such a network, the following facts can be leveraged: 1) The timescale of non-negligible node movement (e.g., vehicle movement on highways) is in seconds, while the timescale of wireless communication is in milliseconds or microseconds, the significantly longer timescale of the physical movement of nodes enables nodes to exchange control signals for PRK-based scheduling adaptation on the fly, and 2) There are well-established, microscopic mobility models for node movement (e.g., vehicle movement), these models help estimate dynamics in node spatial distribution and thus dynamics in signal power attenuation between nodes. Therefore, these models can help enable predictive adaptation of the signal map and the PRK model.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for scheduling wireless transmissions in a distributed sensing and control network, comprising the steps of:
   determining a physical-ratio-constant (PRK) parameter for each link between a receiving sensing and control node and each other sensing and control node in said distributed sensing and control network;
   determining an interference relationship between said receiving sensing and control node and each other sensing and control node in said distributed sensing and control network using a physical-ratio-constant-scheduling (PRKS) protocol based on said determined PRK parameter;
   scheduling transmissions in the distributed sensing and control network based on said interference relationships such that no concurrent transmissions interfere with transmissions received at a receiving sensing and control node.

2. The method of claim 1, wherein said PRK parameter for each link is a minimum real number where a probability for the receiving sensing and control node to successfully receive packets from a sending sensing and control node is at a least a targeted probability.

3. The method of claim 2 wherein said targeted probability is an arbitrary real number between 0 and 1.

4. The method of claim 1, wherein each of said interference relationships is based on received signal strength at the receiving node, and a power attenuation of a transmission from each other sensing and control node to the receiving node.

5. The method of claim 1, wherein said steps of determining a physical-ratio-K (PRK) parameter for each link between a said receiving sensing and control node and each other sensing and control node in said distributed sensing and control network, and determining an interference relationship between said receiving sensing and control node and each other sensing and control node in said distributed sensing and control network using a physical-ratio-K-scheduling (PRKS) protocol based on said determined physical-ratio-K parameter are determined without a priori knowledge of network and environmental conditions.

6. The method of claim 1, wherein said step of determining an interference relationship between said receiving sensor and each other sensing and control node in said distributed sensing and control network further comprises:
   establishing an exclusion region around each sensing and control node in said distributed sensing and control network based on said PRK parameter, wherein each of said exclusion regions is dependent upon said PRK parameter; and
   wherein each of said exclusion regions defines all other sensing and control nodes in said distributed sensing and control network that cause interference when a transmission from the other sensing and control node is concurrent with a transmission receipt at the sensing and control node defining said exclusion region.

7. The method of claim 6, wherein said step of scheduling transmissions in the distributed sensing and control network based on said interference relationships such that no concurrent transmissions interfere with transmissions received at said receiving sensing and control node further comprises each sensing and control node within said distributed sensing and control network preventing itself from concurrently transmitting when a receiving node, in whose exclusion region the sensing and control node is located, is receiving a wireless transmission.

8. The method of claim 6, wherein said step of establishing the exclusion region around each sensing and control node in said distributed sensing and control network using said PRK parameter comprises defining a current exclusion region for a receiving sensing and control node at current time t based on said determined PRK parameter for each link between a receiving sensing and control node and each other sensing and control node in said distributed sensing and control network.

9. The method of claim 8, wherein said exclusion region for said receiving sensing and control node is defined such that a concurrent sensing and control node is within the exclusion religion for said receiving sensing and control node when an expected power of data packet signals from said concurrent sensing and control node to said receiving sensing and control node is greater than or equal to an expected power of data packet signals from a sending sensing and control node to the receiving sensing and control node divided by the PRK model parameter of the receiving sensing and control node.

10. The method of claim 1, wherein said step of determining PRK parameter for each link between a receiving sensing and control node and each other sensing and control node in said distributed sensing and control network further comprises the steps of:
   setting the PRK parameter for a time t+1 as equal to the PRK parameter at a time t when a computed control input at time t is 0;
   setting an exclusion region at the time t+1 to be equal to an exclusion region at the time t, and adding sensing and control nodes not included in the exclusion region at the time t to the exclusion region at the time t+1 in a non-increasing order of data signal power until the sum of the expected interference at time t from nodes in the exclusion region at the time t+1 but not in the exclusion region at the time t is greater than or equal to an absolute value of the computed control input at the time t, then letting the PRK parameter at the time t+1 equal an expected power of data packet signals reaching the receiving sensing and control node from the sending sensing and control node at the time t divided by an expected power of data packet signals reaching the receiving node from the most recently added sensing and control nodes at the time t+1, when the computed control input at the time t is less than 0; and
   setting the exclusion region at the time t+1 as equal to the exclusion region at the time t, and removing sensing and control nodes from the exclusion region at the time t in a non-decreasing order of the data signal power of a signal sent from the removed sensing and control nodes at the receiving sensing and control node until the sum of the expected interference at the time t from nodes in the exclusion region at the time t but not in the exclusion region at the time t+1 is greater than or equal to an absolute value of the computed control input at the time t for the first time, then letting the PRK parameter at the time t+1 equal an expected power of data packet signals reaching the receiving sensing and control node from the sending sensing and control node at the time t divided by an expected power of data packet signals reaching the receiving node from the most recently excluded sensing and control nodes at the time t+1, when the computed control input at the time t is greater than 0; and wherein each of said links has an initial PRK parameter prior to the step of determining a PRK parameter for each link between a receiving sensing and control node and each other sensing and control node in said distributed sensing and control network.

11. The method of claim 1, wherein said PRK parameter is dependent upon a corresponding measured packet delivery reliability and rate of the link.

12. The method of claim 11, further comprising determining a measured packet delivery rate for a sensing and control node link in the distributed sensing and control network at the time t by:

passing a reference input of a minimum link reliability plus a probability control constant through a minimum-variance controller including a smoothed link reliability, thereby determining a computed control input;

combining the computed control input with a change of interference from outside the exclusion region of the receiving sensor from the time t to a time t+1;

passing the combined computed control input and the change of interference from outside the exclusion region of the receiving sensor through a plant model, thereby determining a measured packet delivery rate for a given link at the time t; and passing said measured packet delivery rate through an exponentially weighted moving average filter, thereby determining the smoothed link reliability measurement.

13. The method of claim 1, further comprising the steps of:

establishing a local signal map including the interference relationship between said receiving sensing and control node and each other sensing and control node in said distributed sensing and control network; and storing the local signal map for each sensing and control node at a local memory of the corresponding sensing and control node.

14. The method of claim 13, further comprising the step of placing a receiving sensing and control node in a data channel when said receiving sensing and control node has a highest priority in said local signal map, and placing the receiver sensing and control node in a control channel when said receiving sensing and control node does not have the highest priority in said local signal map based on a stored interference relationship.

15. The method of claim 13, wherein said step of establishing a local signal map including the interference relationship between said receiving sensing and control node and each other sensing and control node in said distributed sensing and control network further comprising updating said local signal map using a local controller when at least one sensing and control node is added to said distributed sensing and control network.

16. The method of claim 13, wherein said local signal map includes an average power attenuation between the sensing and control node storing the local signal map and every sensing and control node within an exclusion region of the sensing and control node storing the local signal map.

17. The method of claim 13, wherein each sensing and control node in a distributed sensing and control network establishes a local signal map corresponding to itself through purely local signaling.

18. The method of claim 1, wherein a physical position of a portion of the sensing and control nodes in said distributed sensing and control network is not constant.

19. The method of claim 18, further comprising the step of sharing said determined PRK parameter and said determined interference relationship with at least one other sensing and control node over a control channel.

20. The method of claim 19, wherein a sensing and control node movement timescale is larger than a wireless communication timescale, such that physical movement of the mobile wireless sensing and control nodes allows for exchanging control signals for PRKS adaption on the fly over said control channel.

21. The method of claim 1, wherein a power attenuation between a portion of the sensing and control nodes of the distributed sensing and control network is not constant.

22. The method of claim 1, wherein said step of scheduling transmissions in the distributed sensing and control network based on said interference relationships such that no concurrent transmissions interfere with transmissions received at a receiving sensing and control node comprises scheduling a transmission from a single sending sensing and control node to a single receiving sensing and control node.

23. The method of claim 1, wherein said step of scheduling transmissions in the distributed sensing and control network based on said interference relationships such that no concurrent transmissions interfere with transmissions received at a receiving sensing and control node comprises scheduling a transmission from a single sending sensing and control node to a plurality of receiving sensing and control nodes simultaneously.

24. The method of claim 23, wherein scheduling a transmission from a single sending sensing and control node to a plurality of receiving sensing and control nodes simultaneously further comprises the step of using a high power signal, thereby explicitly identifying exclusion regions around a set of receivers fully including the plurality of receiving sensing and control nodes such that no nodes within the exclusion regions transmit concurrently with the scheduled transmission.

25. The method of claim 1, wherein data transmissions are scheduled in a time division multiple access (TDMA) manner according to at least one of a link-activated-multiple-access algorithm (LAMA) and an optimized link-activated-multiple-access algorithm (OLAMA).

26. The method of claim 25, wherein the at least one of a LAMA and an OLAMA comprises each node of a conflict graph computing a priority of the node and each of the node's neighboring nodes according to $p_i=\text{Hash}(i \oplus t) \oplus i$, where i is a node id, Hash(x) is a fast message digest generator operable to return a random integer by hashing x, $p_i$ is the priority of the node, and where $\oplus$ is a concatenate operator; and wherein the conflict graph is defined such that the nodes are the data-transmission-links to be scheduled, and there is a link between two nodes in the conflict graph when the corresponding data-transmission-links conflict with each other.

27. The method of claim 26, wherein data transmissions are scheduled in a TDMA manner according to the OLAMA algorithm, and wherein the OLAMA algorithm comprises:

assigning each node an initial undecided status, and then determining a maximal independent set (MIS) of a conflict graph of nodes for a given time based on the computed node priority, wherein the determination comprises each node exchanging a nodal status with each neighboring node;

assigning an active status to a node when a node's priority is higher than the priority of all neighboring nodes with an active status and all neighboring nodes with an undecided status;

assigning an inactive status to the node if any neighboring nodes are both active and have a higher priority than the node; and reiterating the steps of each node exchanging a nodal status with each neighboring node, assigning an active status to a node when a node's priority is higher than the priority of all neighboring nodes with an active status and all neighboring nodes with an undecided status, and assigning an inactive status to the node if any neighboring nodes are both active and have a priority than the node until each node has one of an active status and an inactive status.

28. The method of claim 27, further comprising precomputing a MIS of the conflict graph of nodes for each timeslot.

29. The method of claim 28, wherein a precomputing for time slot t+M begins at time slot t and, where M is a calibrate value determined such that a distributed MIS converges within M slots, and wherein the precomputated MIS is stored until time slot M.

30. The method of claim 29, wherein the precomputation is performed using a snapshot of the conflict graph of nodes, and wherein the snapshot represents the conflict graph of nodes as the conflict graph of nodes existed at the time slot where precomputation began.

* * * * *